(12) United States Patent
Mitani et al.

(10) Patent No.: US 10,011,160 B2
(45) Date of Patent: Jul. 3, 2018

(54) VEHICLE

(71) Applicant: HONDA MOTOR CO., LTD., Tokyo (JP)

(72) Inventors: Manabu Mitani, Wako (JP); Koichi Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/296,038

(22) Filed: Oct. 18, 2016

(65) Prior Publication Data

US 2017/0106734 A1 Apr. 20, 2017

(30) Foreign Application Priority Data

Oct. 20, 2015 (JP) .................................. 2015-206582

(51) Int. Cl.
*B60K 1/04* (2006.01)

(52) U.S. Cl.
CPC ........ *B60K 1/04* (2013.01); *B60K 2001/0416* (2013.01); *B60Y 2306/01* (2013.01)

(58) Field of Classification Search
CPC .... B60K 2001/0416; B60K 2001/0405; B60K 1/04; B60Y 2306/01
See application file for complete search history.

(56) References Cited

U.S. PATENT DOCUMENTS

| | | | | |
|---|---|---|---|---|
| 6,010,181 A * | 1/2000 | Robbins | ............... | B60G 15/063 296/203.01 |
| 6,088,918 A * | 7/2000 | Corporon | ............. | B60G 15/063 29/469 |
| 6,241,309 B1 * | 6/2001 | Roehl | ................. | B62D 25/087 296/198 |
| 6,802,558 B2 * | 10/2004 | Matsuoka | ............ | B62D 25/087 296/193.08 |
| 6,988,575 B2 * | 1/2006 | Takedomi | ................ | B60K 1/04 180/65.1 |
| 7,004,274 B2 * | 2/2006 | Shibasawa | .......... | H01M 2/1083 180/68.5 |
| 7,021,412 B2 * | 4/2006 | Koike | ................. | H01M 2/1055 180/68.5 |

(Continued)

FOREIGN PATENT DOCUMENTS

JP 2014-127338 7/2014

*Primary Examiner* — Jacob B Meyer
(74) *Attorney, Agent, or Firm* — Mori & Ward, LLP

(57) ABSTRACT

A vehicle includes a right pillar, a left pillar, a high voltage equipment-accommodation portion, a high voltage equipment, and a high voltage equipment-protection cover. The right pillar is provided at a right end part. The left pillar is provided at a left end part. The high voltage equipment-accommodation portion is provided between the pillars. The high voltage equipment is provided in the high voltage equipment-accommodation portion and has a front face. The high voltage equipment-protection cover covers the high voltage equipment-accommodation portion to cover the front face. The high voltage equipment-protection cover includes a right extension portion and a left extension portion. Each of the extension portions has a groove portion or a bent portion. Each of the extension portions is bent toward front at the groove portion or the bent portion.

13 Claims, 9 Drawing Sheets

(56) References Cited

U.S. PATENT DOCUMENTS

| | | | |
|---|---|---|---|
| 7,025,160 B2* | 4/2006 | Awakawa | B60K 1/04 180/68.5 |
| 7,083,225 B2* | 8/2006 | Yakata | B62D 25/088 296/187.11 |
| 7,401,669 B2* | 7/2008 | Fujii | B60R 16/04 180/65.1 |
| 7,766,544 B2* | 8/2010 | Shibuya | B60K 1/04 320/150 |
| 8,393,426 B2* | 3/2013 | Takahashi | B60K 1/04 180/68.5 |
| 8,439,436 B2* | 5/2013 | Kato | B60L 11/1874 297/180.1 |
| 8,469,129 B2* | 6/2013 | Mildner | B60K 1/04 180/68.5 |
| 8,585,134 B2* | 11/2013 | Yasui | B62D 21/152 296/204 |
| 8,684,118 B2* | 4/2014 | Kosaka | B60H 1/00278 180/68.2 |
| 8,708,390 B2* | 4/2014 | Kurogi | B62D 25/02 296/203.03 |
| 8,714,616 B2* | 5/2014 | Minami | B60K 1/04 296/37.16 |
| 8,717,761 B2* | 5/2014 | Aoki | B60K 1/04 165/104.33 |
| 8,739,911 B2* | 6/2014 | Katou | B60K 1/04 180/68.5 |
| 8,763,740 B2* | 7/2014 | Marcath | B60K 1/04 180/68.2 |
| 8,763,741 B2* | 7/2014 | Harunari | B60K 1/04 180/68.5 |
| 8,813,888 B2* | 8/2014 | Ogawa | B62D 25/082 180/180 |
| 8,991,906 B2* | 3/2015 | Shimizu | B62D 25/087 296/193.08 |
| 9,174,520 B2* | 11/2015 | Katayama | B60K 1/04 |
| 9,180,773 B2* | 11/2015 | Honda | B60K 11/06 |
| 9,187,136 B1* | 11/2015 | Leanza | B62D 25/20 |
| 9,381,952 B2* | 7/2016 | Furusaki | B62D 21/152 |
| 9,517,687 B2* | 12/2016 | Nakajima | B62D 21/157 |
| 9,550,531 B2* | 1/2017 | Yamada | B62D 25/087 |
| 9,815,426 B2* | 11/2017 | Hamada | B60R 21/026 |
| 2003/0193215 A1* | 10/2003 | Gennai | B62D 25/025 296/203.01 |
| 2004/0113462 A1* | 6/2004 | Winter | B62D 21/155 296/203.02 |
| 2007/0238015 A1* | 10/2007 | Kubota | H01M 10/4207 429/120 |
| 2013/0330587 A1* | 12/2013 | Takahashi | H01M 2/1077 429/99 |
| 2014/0045090 A1* | 2/2014 | Matsumoto | B60K 1/04 429/455 |
| 2014/0300138 A1* | 10/2014 | Gonda | B62D 25/2027 296/187.12 |
| 2015/0158532 A1* | 6/2015 | Ayuzawa | B62D 25/2009 296/193.07 |
| 2015/0246606 A1* | 9/2015 | Katayama | B60K 1/04 180/65.1 |
| 2016/0236574 A1* | 8/2016 | Asai | B60K 1/04 |
| 2017/0106735 A1* | 4/2017 | Mitani | B60K 1/04 |
| 2017/0297633 A1* | 10/2017 | Ayuzawa | B62D 25/025 |

* cited by examiner

VEHICLE

CROSS-REFERENCE TO RELATED APPLICATIONS

The present application claims priority under 35 U.S.C. § 119 to Japanese Patent Application No. 2015-206582, filed Oct. 20, 2015. The contents of this application are incorporated herein by reference in their entirety.

BACKGROUND OF THE INVENTION

Field of the Invention

The present invention relates to a vehicle.

Discussion of the Background

High voltage equipment including a battery (high voltage battery), a DC-DC converter, and an inverter is installed in vehicles such as an electric vehicle and a hybrid vehicle. For example, Japanese Patent Application Publication No. 2014-127338 discloses a vehicle in which high voltage equipment is arranged between a right and left pair of pillars standing on both end parts in the vehicle width direction, and a high voltage equipment-protection cover covers at least the front of the high voltage equipment.

SUMMARY OF THE INVENTION

According to one aspect of the present invention, a vehicle includes a right and left pair of pillars, a high voltage equipment-accommodation portion, and high voltage equipment. The right and left pair of pillars stands on both end parts in the vehicle width direction. The high voltage equipment-accommodation portion is partitioned between the right and left pair of pillars. The high voltage equipment is arranged in the high voltage equipment-accommodation portion. The high voltage equipment is covered with a high voltage equipment-protection cover covering the high voltage equipment-accommodation portion from the front. The high voltage equipment-protection cover has, in both end parts in the vehicle width direction thereof, an extension portion extending to the vicinity of the pillar. The extension portion has any one of a groove portion and a bent portion extending along the vertical direction. The part of the extension portion on the outer side of any one of the groove portion and the bent portion is bent toward the vehicle front at a predetermined angle, from any one of the groove portion and the bent portion.

According to another aspect of the present invention, a vehicle includes a right pillar, a left pillar, a high voltage equipment-accommodation portion, a high voltage equipment, and a high voltage equipment-protection cover. The right pillar is provided at a right end part in a vehicle width direction perpendicular to a front-rear direction of the vehicle. The left pillar is provided at a left end part opposite to the right end part in the vehicle width direction. The high voltage equipment-accommodation portion is provided between the right pillar and the left pillar in the vehicle width direction. The high voltage equipment is provided in the high voltage equipment-accommodation portion. The high voltage equipment has a front face which faces toward a front direction in the front-rear direction. The high voltage equipment-protection cover covers the high voltage equipment-accommodation portion to cover the front face of the high voltage equipment. The high voltage equipment-protection cover includes a right extension portion and a left extension portion opposite to the right extension portion in the vehicle width direction. The right extension portion is provided in a vicinity of the right pillar. The left extension portion is provided in a vicinity of the left pillar. Each of the right extension portion and the left extension portion has a groove portion or a bent portion. Each of the right extension portion and the left extension portion is bent toward the front direction at the groove portion or the bent portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
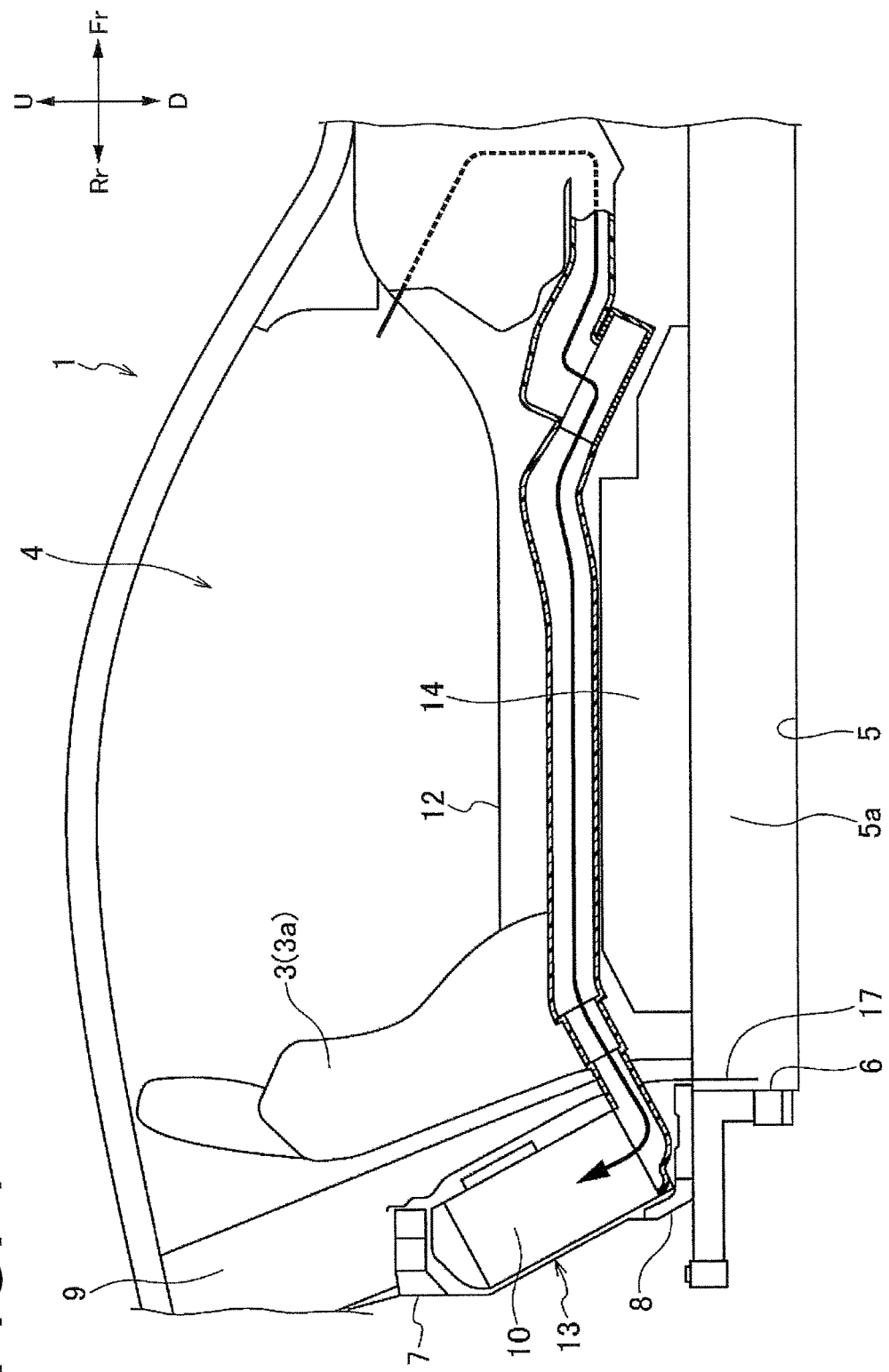
FIG. 1 is a schematic right side view of the interior of a vehicle according to an embodiment of the present invention.

The embodiments will now be described with reference to the accompanying drawings, wherein like reference numerals designate corresponding or identical elements throughout the various drawings.

Hereinafter, an embodiment of a vehicle of the present invention will be described with reference to the accompanying drawings. Note that the drawings are to be viewed in the direction of the reference numerals. In the following description, front and rear, right and left, and upper and lower directions are based on directions as viewed from the driver, and in the drawings, Fr indicates the front, Rr indicates the rear, L indicates the left, R indicates the right, U indicates the upper direction, and D indicates the lower direction of the vehicle.

[Vehicle]

Figure 2:
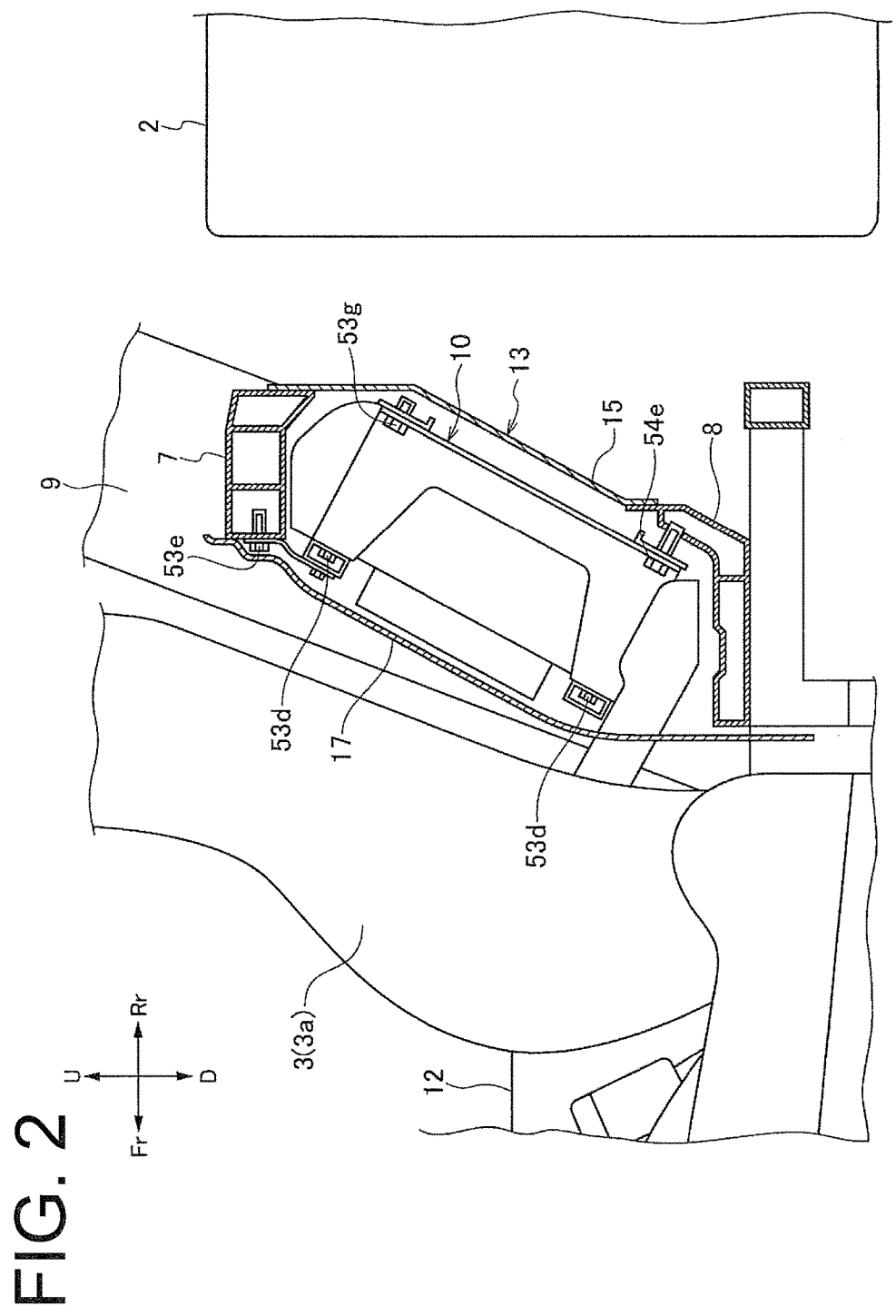
FIG. 2 is a left side view in which the rear of a seat is enlarged.

FIG. 1 is a schematic right side view of the interior of the vehicle according to an embodiment of the present invention, and FIG. 2 is a left side view in which the rear of a seat is enlarged.

As shown in FIGS. 1 and 2, a vehicle 1 of the embodiment is a hybrid sports vehicle in which an engine 2 is installed in a rear part of the vehicle body, and right and left seats 3 are arranged in front of the engine. In the vehicle, engine power drives right and left rear wheels (not shown), and two motors (not shown) drive right and left front wheels (not shown).

A floor panel 5 constituting a floor surface of a vehicle interior 4 includes a center tunnel 5a, which extends along the longitudinal direction at the center in the vehicle width direction. An upward rising kick-up portion 6 is formed in a rear end part of the floor panel 5. An inverter case 14 accommodating an inverter (not shown), which converts a DC voltage of a high voltage battery into a three-phase AC voltage and drives the motors, is provided above the center tunnel 5a. The seats 3 are arranged in front of the kick-up portion 6, on the right and left with the center tunnel 5a interposed therebetween, and a center console 12 covering an upper part of the center tunnel 5a is provided between the right and left seats 3.

An upper member 7 extending in the vehicle width direction is arranged in an upper part behind the seats 3, and a lower member 8 extending in the vehicle width direction on an upper part of the kick-up portion 6 is arranged in a lower part behind the seats 3. Also, a right and left pair of pillars 9 stand on both end parts in the vehicle width direction of the vehicle 1, behind the seats 3 in side view. A high voltage equipment-accommodation portion 13 is provided between the right and left pair of pillars 9.

[High Voltage Equipment-Accommodation Portion]

Figure 3:
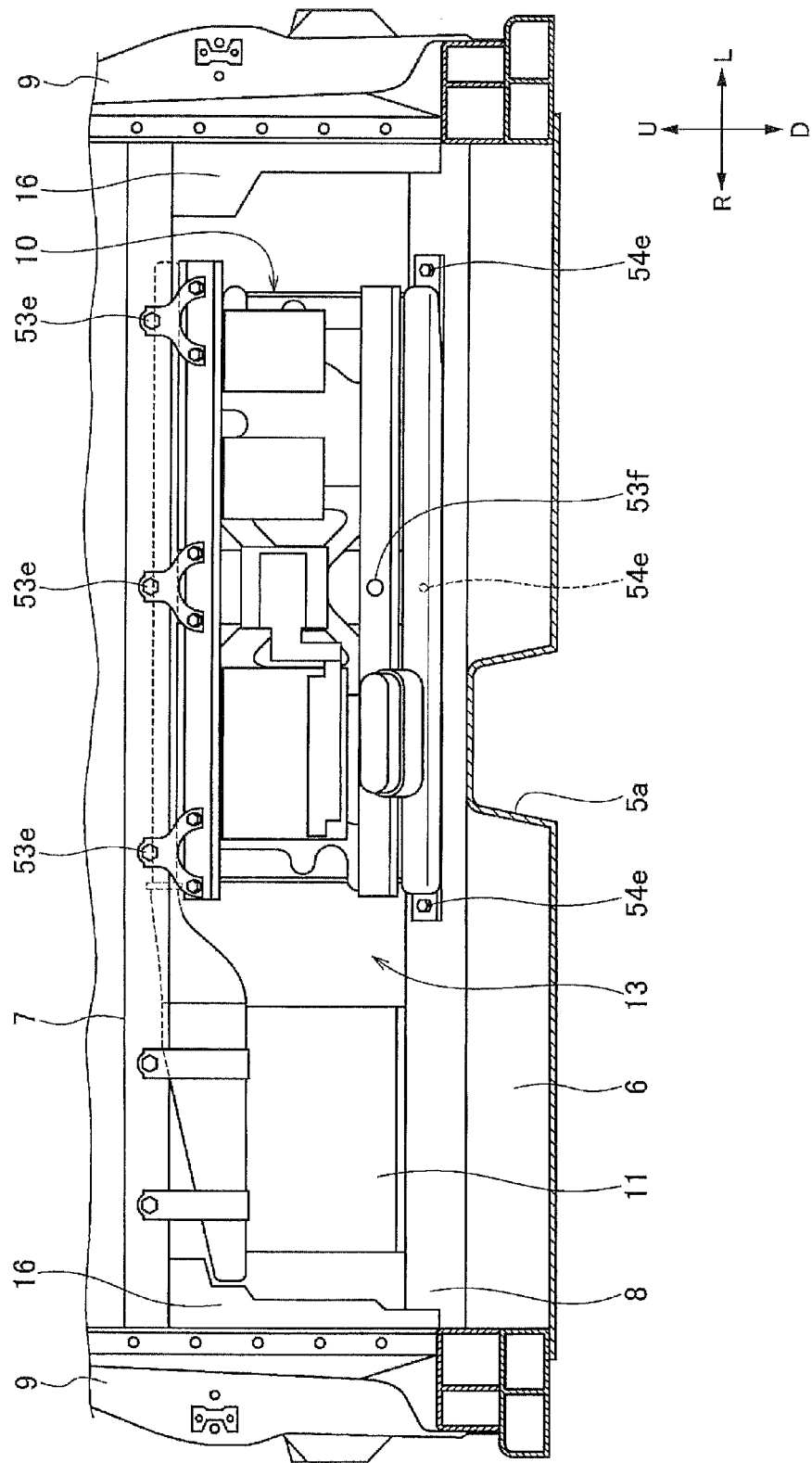
FIG. 3 is a front view of a high voltage equipment-accommodation portion in which a battery unit is arranged.
Figure 7:
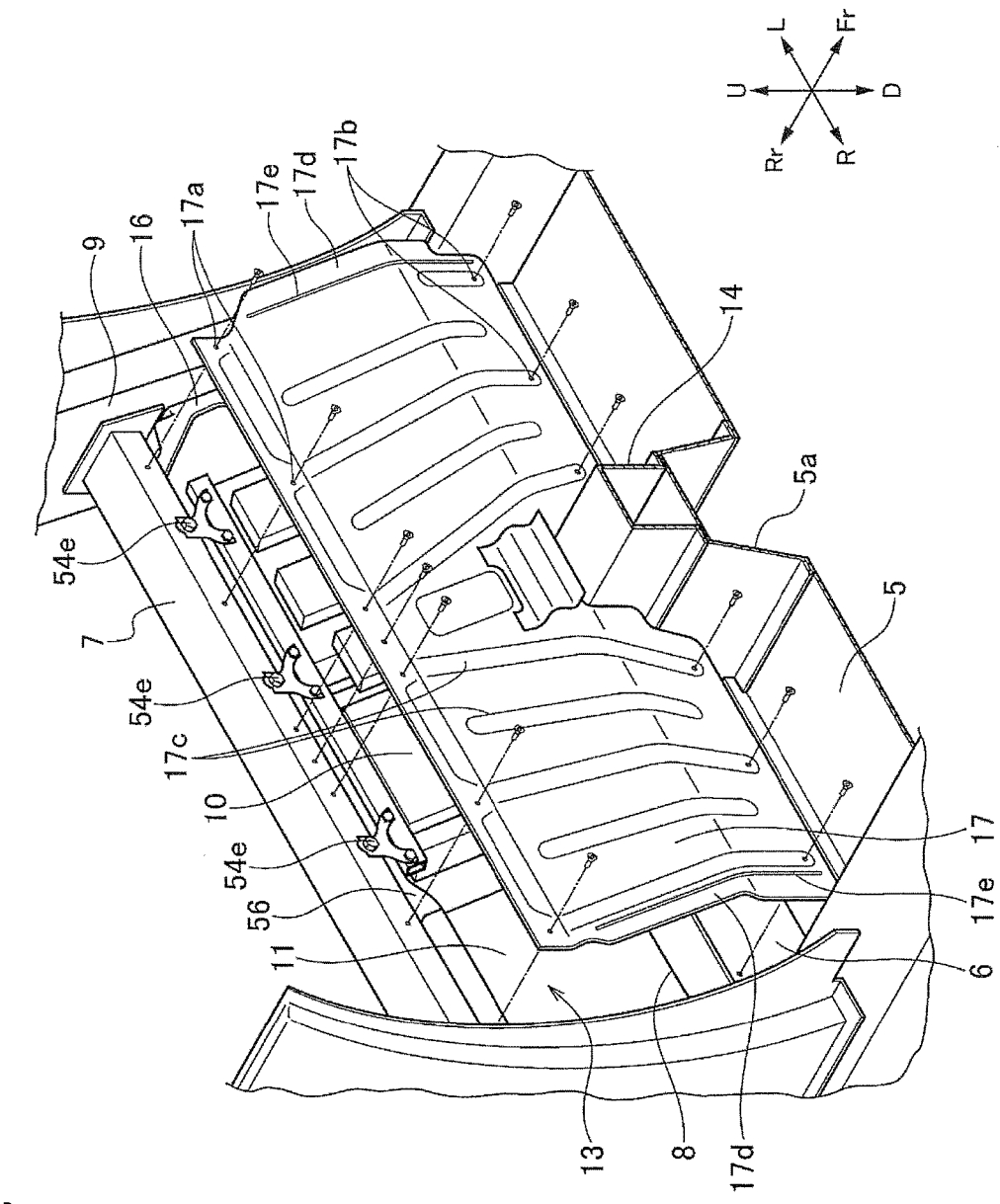
FIG. 7 is an exploded perspective view of a high voltage equipment-protection cover covering the front of the high voltage equipment-accommodation portion.

FIG. 3 is a front view of the high voltage equipment-accommodation portion 13, and FIG. 7 is an exploded perspective view of a high voltage equipment-protection cover 17 covering the front of the high voltage equipment-accommodation portion 13.

As shown in FIGS. 2 and 3, in the high voltage equipment-accommodation portion 13, the upper member 7 partitions an upper part, the lower member 8 partitions a lower part, the right and left pillars 9 partition right and left sides, and a rear cover 15, which is fastened to the upper member 7, lower member 8, and right and left pillars 9, partitions a rear part. The high voltage equipment-accommodation portion 13 accommodates a battery unit 10 and a DC-DC converter 11, which steps the high voltage battery down and supplies the voltage to low voltage equipment.

As shown in FIG. 7, the high voltage equipment-protection cover 17 covers the front of the high voltage equipment-accommodation portion 13, which accommodates the battery unit 10 and the DC-DC converter 11. The high voltage equipment-protection cover 17 includes multiple fastening points 17a, 17b in upper and lower end parts thereof. The high voltage equipment-protection cover 17 partitions the front part of the high voltage equipment-accommodation portion 13, when the fastening points 17a, 17b are fastened to the upper member 7 and the lower member 8. Note that details of the high voltage equipment-protection cover 17 will be described later.

[High Voltage Equipment]

The vehicle 1 is provided with the battery unit 10 consisting of a high voltage battery, as high voltage equipment. As mentioned above, the battery unit 10, together with the DC-DC converter 11 which is also high voltage equipment, is accommodated in the high voltage equipment-accommodation portion 13 provided behind the seats 3.

Figure 4:
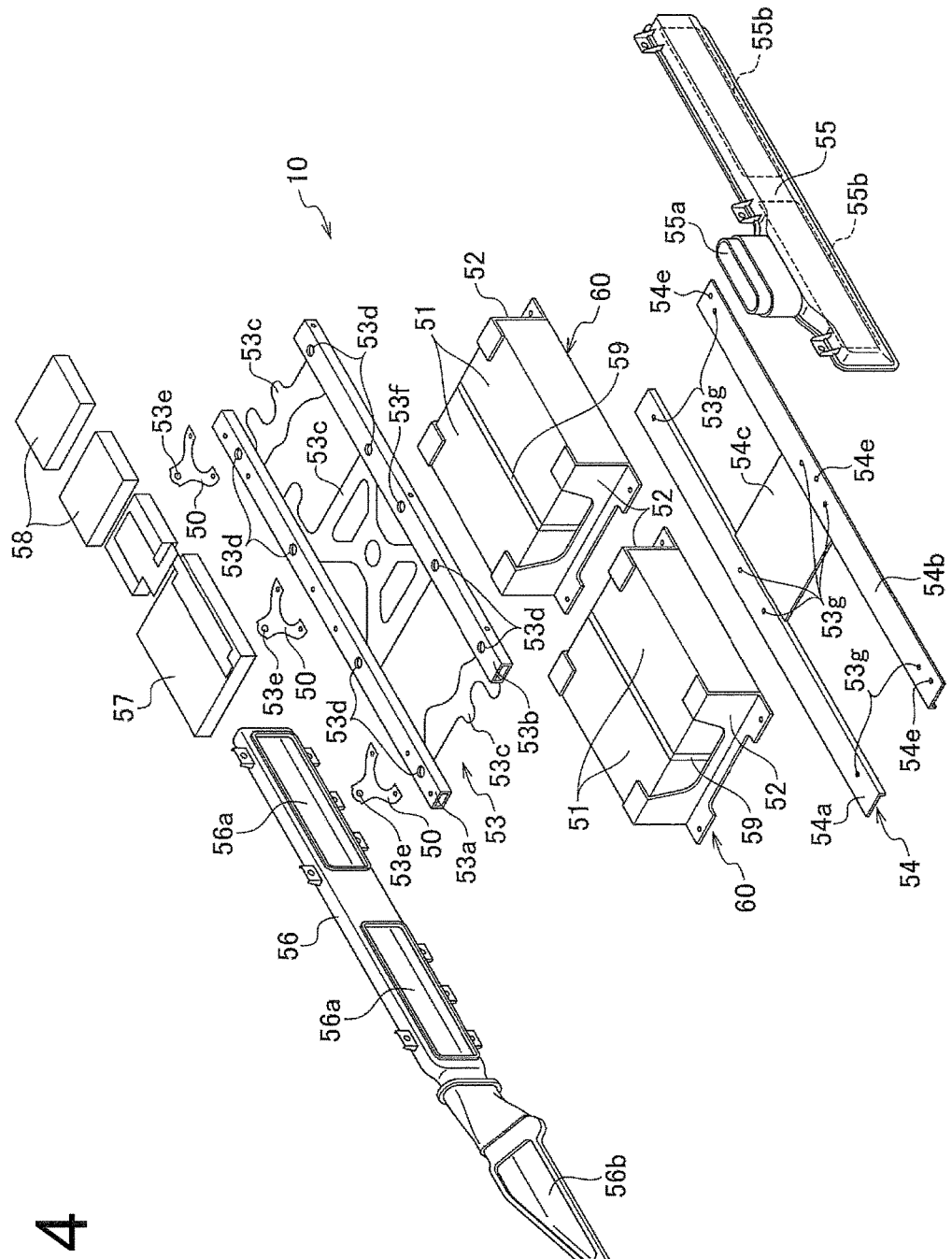
FIG. 4 is an exploded perspective view of the battery unit.
Figure 5:
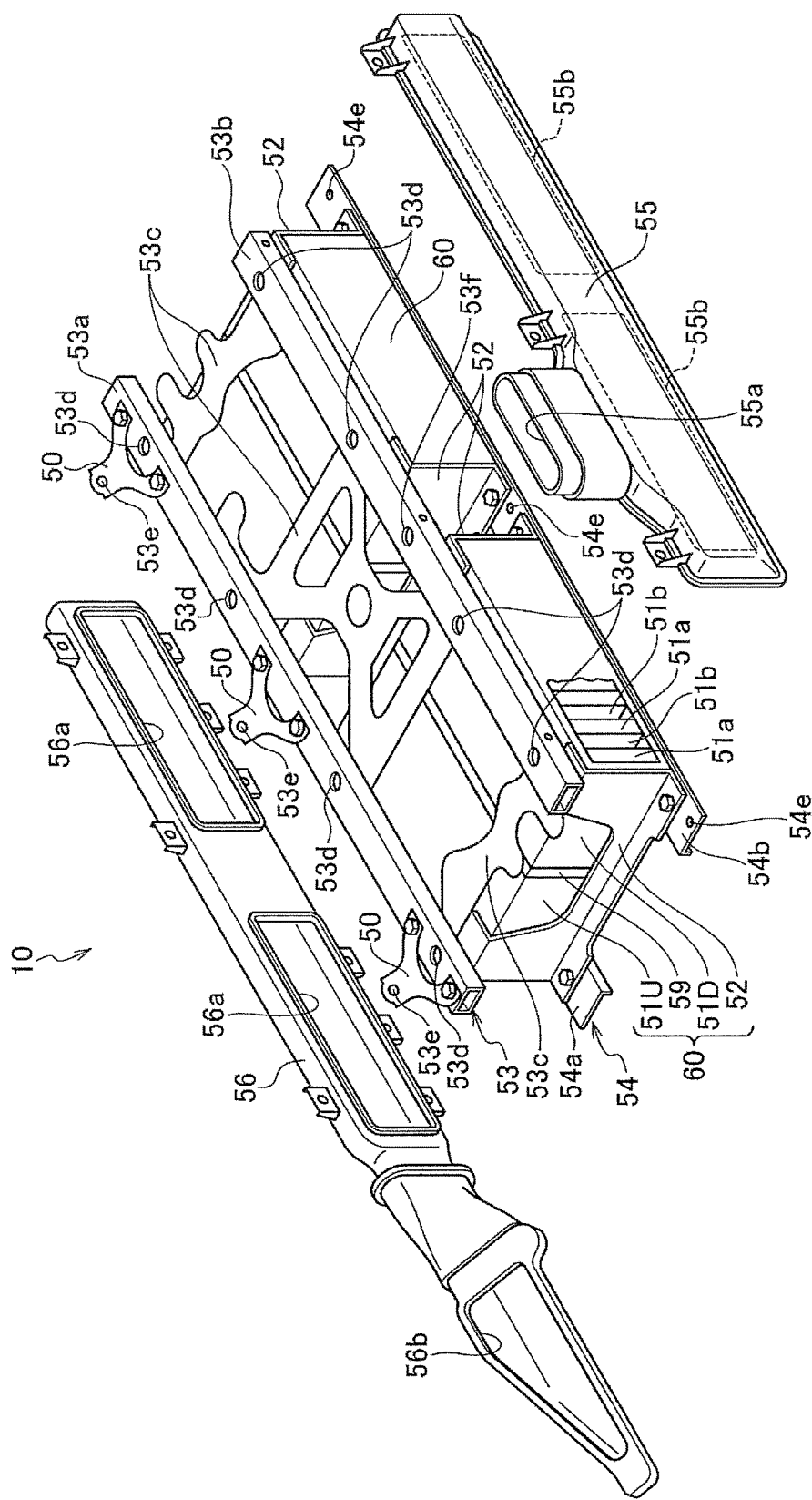
FIG. 5 is an exploded perspective view of the battery unit in which only ducts are disassembled.
Figure 6:
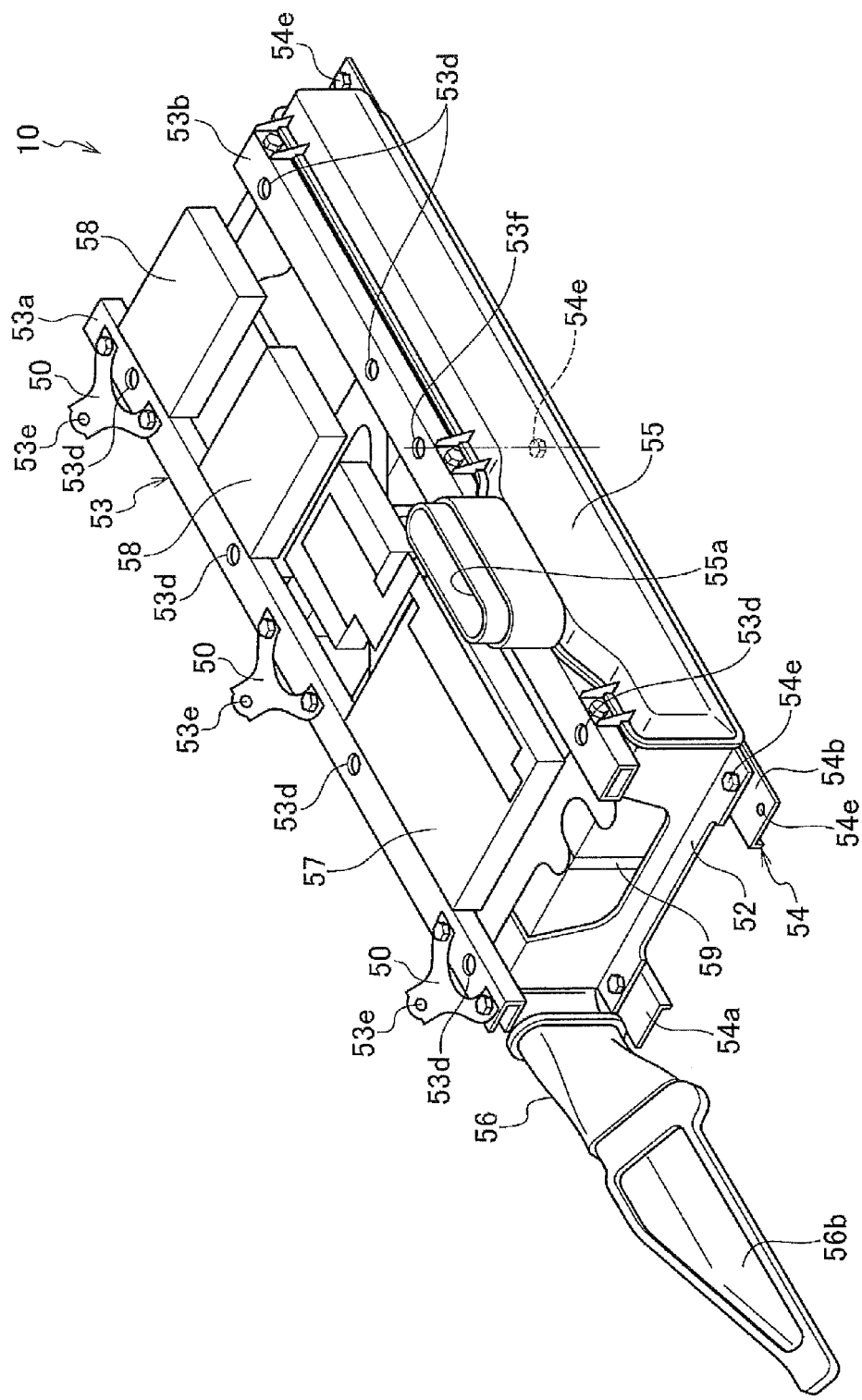
FIG. 6 is a perspective view of the battery unit.

FIG. 4 is an exploded perspective view of the battery unit 10, FIG. 5 is an exploded perspective view of the battery unit 10 in which only ducts are dissembled, and FIG. 6 is a perspective view of the battery unit 10.

As shown in FIGS. 4 to 6, the battery unit 10 includes: multiple battery modules 51; multiple battery brackets 52 supporting right and left side parts of the battery module 51; a front frame 53 provided along a front surface of the battery unit 10 and supporting the multiple battery modules 51 through the battery brackets 52; a rear frame 54 provided along a rear surface of the battery unit 10 and supporting the multiple battery modules 51 through the battery brackets 52; an inlet duct 55 provided along a lower surface of the battery unit 10, and introducing cooling air fed from outside the high voltage equipment-accommodation portion 13 into the battery modules 51; an exhaust duct 56 provided along an upper surface of the battery unit 10, and discharging cooling air having passed through the battery modules 51 to the DC-DC converter 11; a battery control unit 57 provided on the front frame 53, and controlling charging and discharging of the battery modules 51; and a pair of motor control units 58 provided on the front frame 53, and controlling driving of the motors.

The battery module 51 includes multiple batteries 51a arranged in parallel, with cooling air passages 51b interposed therebetween. The battery module 51 includes an upper battery module 51U and a lower battery module 51D stacked in the flow direction of cooling air, and an intermediate duct 59 that prevents leakage of cooling air is arranged between the upper battery module 51U and the lower battery module 51D. The vertically stacked upper battery module 51U and lower battery module 51D are connected by the battery brackets 52 provided on both right and left side surfaces thereof, and form a battery assembly 60. The battery unit 10 of the embodiment is configured of two battery assemblies 60 arranged side by side in the vehicle width direction.

The front frame 53 includes: an upper frame member 53a extending in the vehicle width direction in an upper part of the front surface of the battery unit 10; a lower frame member 53b extending in the vehicle width direction in a lower part of the front surface of the battery unit 10; and multiple connection members 53c connecting the upper frame member 53a and the lower frame member 53b. Multiple battery fastening points 53d fastened to the battery brackets 52 are provided in the upper frame member 53a and the lower frame member 53b. Additionally, three Y-formed brackets 50 each having an upper fastening point 53e fastened to the upper member 7 are attached to the upper frame member 53a, while a tool insertion hole 53f for inserting a tool when fastening the rear frame 54 to the lower member 8 is formed at the center in the vehicle width direction of the lower frame member 53b.

The rear frame 54 includes: an upper frame member 54a extending in the vehicle width direction in an upper part of the rear surface of the battery unit 10; a lower frame member 54b extending in the vehicle width direction in a lower part of the rear surface of the battery unit 10; and a connection member 54c connecting the upper frame member 54a and the lower frame member 54b. Multiple battery fastening points 53g fastened to the battery brackets 52 are provided in the upper frame member 54a and the lower frame member 54b. Three lower fastening points 54e fastened to the lower member 8 are provided in the lower frame member 54b.

The inlet duct 55 includes: an inlet port 55a for introducing cooling air fed from outside the high voltage equipment-accommodation portion 13 into the duct; and two battery connection ports 55b connected to the lower surface side of the lower battery modules 51D, and allowing cooling air inside the duct to flow into the passages 51b in the lower battery modules 51D. Note that in the embodiment, cooling air having passed through an air conditioning system of the vehicle 1 is transmitted to the inlet duct 55 of the battery unit 10, through a supply duct provided inside the center console 12.

The exhaust duct 56 includes; two battery connection ports 56a connected to the upper surface side of the upper battery modules 51U, and introducing cooling air having flowed out from the passages 51b in the upper battery modules 52U into the duct; and an exhaust port 56b for discharging cooling air inside the duct to the DC-DC converter 11.

When storing the battery unit 10 and the DC-DC converter 11 in the high voltage equipment-accommodation portion 13, first, a rear insulator (not shown) extending along a front surface of the rear cover 15, and right and left side insulators 16 extending along the inner side of the right and left pillars 9 are attached inside the high voltage equipment-accommodation portion 13. Then, while the battery unit 10 is positioned in a left offset position inside the high voltage equipment-accommodation portion 13, the upper fastening points 53e of the front frame 53 are fastened to the upper member 7 with bolts, and the lower fastening points 54e of the rear frame 54 are fastened to the lower member 8 with bolts. Note that when fastening the middle lower fastening point 54e of the rear frame 54 to the lower member 8 with a bolt, a tool is inserted into the tool insertion hole 53f formed at the center in the vehicle width direction of the lower frame member 53b, and the rear frame 54 is fastened to the lower member 8 with a bolt. Thus, the battery unit 10 is fixed inside the high voltage equipment-accommodation portion 13, while being tilted rearward along a back 3a of the seat 3 in side view. Thereafter, the DC-DC converter 11 is positioned in a right offset position inside the high voltage equipment-accommodation portion 13, and fastened to the upper member 7 and the lower member 8.

As mentioned above, the battery unit 10 accommodated in the high voltage equipment-accommodation portion 13 provided behind the seat 3 is tilted rearward along the back 3a of the seat 3 in side view, while its upper part is fastened to the upper member 7 through multiple upper fastening points 53e, and its lower part is fastened to the lower member 8 through multiple lower fastening points 54e. Accordingly, the upper member 7 and the lower member 8 support the battery unit 10 at both ends in the vertical direction.

[High Voltage Equipment-Protection Cover]

The high voltage equipment-protection cover 17 is a part manufactured by punching and pressing a metal plate, and is a rectangle long in the vehicle width direction as a whole. Multiple vertically and obliquely extending ribs 17c (uneven parts) ensure necessary strength of the high voltage equipment-protection cover.

Figure 8:
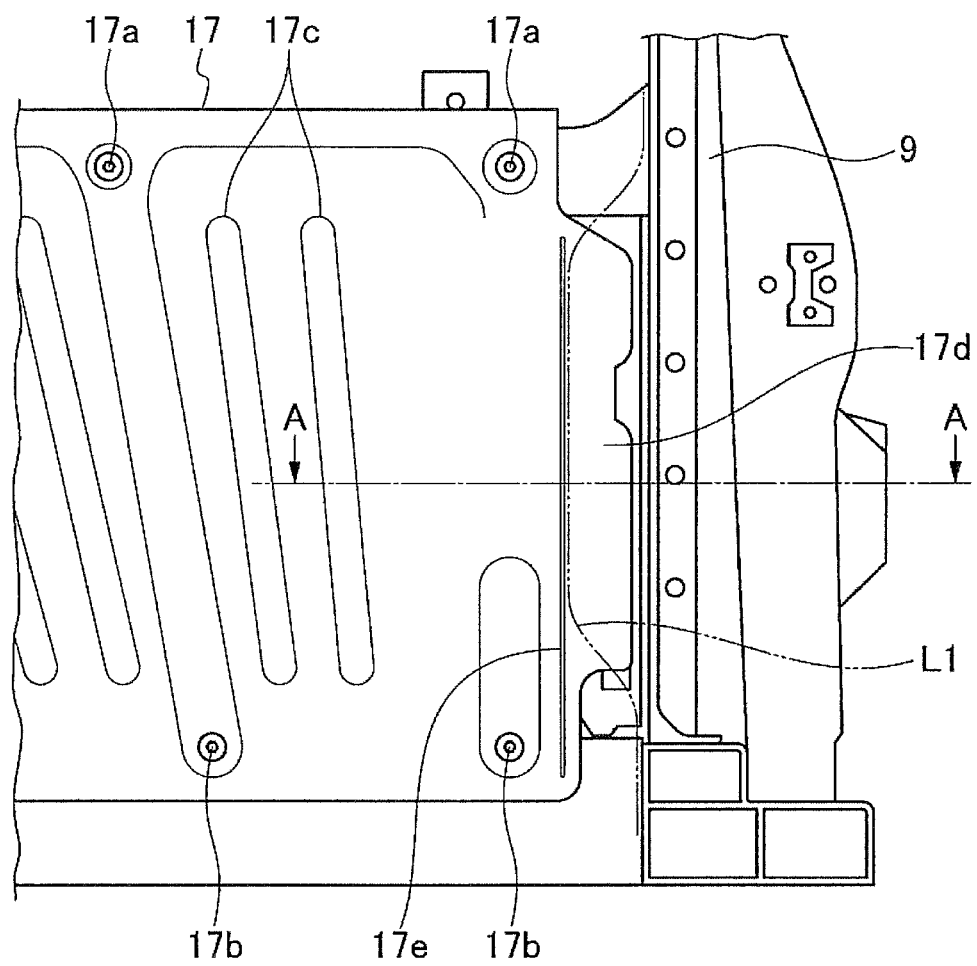
FIG. 8 is a front view of a main part of the high voltage equipment-protection cover.
Figure 9:
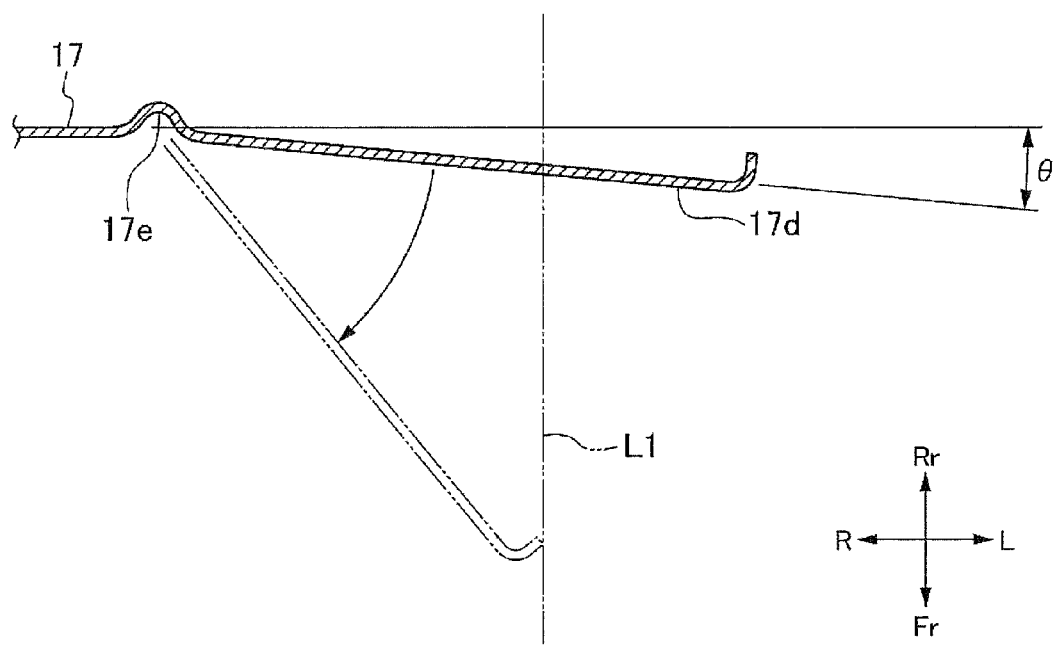
FIG. 9 is a cross-sectional view taken along A-A of FIG. 8.

FIG. 8 is a front view of a main part of the high voltage equipment-protection cover 17, and FIG. 9 is a cross-sectional view taken along A-A of FIG. 8.

As shown in FIGS. 8 and 9, an extension portion 17d extending to the vicinity of the pillar 9 and covering the front of the side insulator 16 is formed, in both end parts in the vehicle width direction of the high voltage equipment-protection cover 17. The extension portion 17d has a groove portion 17e recessed rearward along the vertical direction, in an extension base part thereof. The groove portion 17e is positioned on the outer side in the vehicle width direction of the fastening point 17a fastened to the upper member 7, and the fastening point 17b fastened to the lower member 8. Additionally, a part of the extension portion 17d on the outer side of the groove portion 17e is bent toward the vehicle front at a predetermined angle θ, from the groove portion 17e. The predetermined angle θ is preferably 0° to 10°, and more preferably 3° to 7°.

Next, an effect of the extension portion 17d at the time of a side collision will be described with reference to FIGS. 3, 8 and 9.

As shown in FIG. 3, in vehicle 1, assuming that the pillars 9 will protrude into the vehicle at the time of a side collision, a space is ensured between the left pillar 9 and the battery unit 10 and the right pillar 9 and the DC-DC converter 11, to allow protrusion of the pillars 9. The side insulators 16 are arranged in these spaces.

As indicated by a virtual line L1 in FIGS. 8 and 9, when a side collision occurs in the vehicle 1, the pillar 9 protrudes into the vehicle. Here, even if the pillar 9 can be kept from coming into contact with the battery unit 10 or the DC-DC converter 11, the pillar 9 comes into contact with an end part in the vehicle width direction of the high voltage equipment-protection cover 17. At this time, the part that comes into contact with the pillar 9 is the extension portion 17d provided on the end part in the vehicle width direction of the high voltage equipment-protection cover 17. Although the extension portion 17d deforms by coming into contact with the pillar 9, the extension portion is already bent toward the vehicle front at a predetermined angle from the groove portion 17e, and therefore deforms toward the vehicle front from the groove portion 17e when it comes into contact with the pillar 9. Hence, the pillar can be kept from coming into contact with the battery unit 10 or the DC-DC converter 11.

As has been described, according to the vehicle 1 of the embodiment, the high voltage equipment-protection cover 17 has, in both end parts in the vehicle width direction thereof, the extension portion 17d extending to the vicinity of the pillar 9 and having the groove portion 17e that extends along the vertical direction; and the part of the extension portion 17d on the outer side of the groove portion 17e is bent toward the vehicle front at a predetermined angle, from the groove portion 17e. Hence, even if the pillar 9 protruding into the vehicle due to a side collision comes into contact with the extension portion 17d of the high voltage equipment-protection cover 17, the extension portion 17d deforms toward the vehicle front from the groove portion 17e. As a result, the deformed part of the high voltage equipment-protection cover 17 can be kept from coming into contact with and damaging the battery unit 10 or the DC-DC converter 11.

Also, the groove portion 17e of the extension portion 17d is positioned on the outer side in the vehicle width direction of the fastening points 17a, 17b of the high voltage equipment-protection cover 17 to the upper member 7 and the lower member 8. Hence, the extension portion 17d can be bent toward the vehicle front without affecting the fastening points 17a, 17b.

Also, since the extension portion 17d is a part that covers the front of the side insulator 16, it can be bent toward the vehicle front without degrading the original function of the high voltage equipment-protection cover 17.

Note that the present invention is not limited to the embodiment described above, and may be modified or improved, for example, as is appropriate.

For example, instead of the groove portion 17e recessed rearward along the vertical direction in the extension base part, the extension portion 17d may have a simple bent portion extending along the vertical direction. Apart on the outer side of the bent part may be bent toward the vehicle front at a predetermined angle θ from the bent portion.

Moreover, while the embodiment uses the battery unit and the DC-DC converter as an example of high voltage equipment to which the present invention is applied, the high voltage equipment to which the present invention is applied may be any one of a battery unit, a DC-DC converter, and an inverter, or a combination of two or more of these devices. Also, the battery does not necessarily have to be unitized.

A vehicle (e.g. the vehicle 1 of the embodiment) includes: a right and left pair of pillars (e.g. the pillar 9 of the embodiment) standing on both end parts in the vehicle width direction; a high voltage equipment-accommodation portion (e.g. the high voltage equipment-accommodation portion 13 of the embodiment) partitioned between the right and left pair of pillars; and high voltage equipment (e.g. the battery unit 10 and the DC-DC converter 11 of the embodiment) arranged in the high voltage equipment-accommodation portion. The high voltage equipment is covered with a high voltage equipment-protection cover (e.g. the high voltage equipment-protection cover 17 of the embodiment) covering the high voltage equipment-accommodation portion from the front. The high voltage equipment-protection cover has, in both end parts in the vehicle width direction thereof, an extension portion (e.g. the extension portion 17d of the embodiment) extending to the vicinity of the pillar. The extension portion has a groove portion or a bent portion (e.g. the groove portion 17e of the embodiment) extending along the vertical direction, Apart of the extension portion on the outer side of the groove portion or the bent portion is bent toward the vehicle front at a predetermined angle, from the groove portion or the bent portion.

The vehicle further includes: an upper member (e.g. the upper member 7 of the embodiment) extending in the vehicle width direction, and to which an upper fastening point (e.g. the fastening point 17a of the embodiment) of the high voltage equipment-protection cover is fastened; and a lower member (e.g. the lower member 8 of the embodiment) extending in the vehicle width direction, and to which a lower fastening point (e.g. the fastening point 17b of the embodiment) of the high voltage equipment-protection cover is fastened. The groove portion or the bent portion is positioned on the outer side in the vehicle width direction of the upper fastening point and the lower fastening point.

The vehicle further includes an insulator (e.g. the side insulator 16 of the embodiment) arranged between the high voltage equipment and the pillar. The extension portion covers the front of the insulator.

[Effect]

The high voltage equipment-protection cover has, in both end parts in the vehicle width direction thereof, the extension portion extending to the vicinity of the pillar and having the groove portion or the bent portion that extends along the vertical direction; and the part of the extension portion on the outer side of the groove portion or the bent portion is bent toward the vehicle front at a predetermined angle, from the groove portion or the bent portion. Hence, even if the pillar protruding into the vehicle due to a side collision comes into contact with the extension portion of the high voltage equipment-protection cover, the extension portion deforms toward the vehicle front from the groove portion or the bent portion. As a result, the deformed part of the high voltage equipment-protection cover can be kept from coming into contact with and damaging the high voltage equipment.

Also, the groove portion or the bent portion of the extension portion is positioned on the outer side in the vehicle width direction of the fastening points of the high voltage equipment-protection cover to the upper member and the lower member. Hence, the extension portion can be bent toward the vehicle front without affecting the fastening points.

Also, the extension portion of the high voltage equipment-protection cover can protect the insulator.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
a right and left pair of pillars standing on opposed end parts in a vehicle width direction;
a high voltage equipment-accommodation portion partitioned between said right and left pair of pillars; and
high voltage equipment arranged in said high voltage equipment-accommodation portion, wherein:
said high voltage equipment is covered with a high voltage equipment-protection cover covering said high voltage equipment-accommodation portion with respect to a front of the vehicle;
said high voltage equipment-protection cover has, in both end parts in the vehicle width direction thereof, an extension portion extending to the vicinity of one of said right and left pillars;
each said extension portion has any one of a groove portion and a bent portion extending along a vertical direction; and
a part of each said extension portion extending from the outer side in the vehicle width direction of any one of said groove portion and said bent portion is bent toward the front of the vehicle at a predetermined angle with respect to an inner portion of said high voltage equipment-protection cover extending from an inner side of any one of said groove portion and said bent portion in the vehicle width direction.

2. The vehicle according to claim 1, further comprising:
an upper member extending in the vehicle width direction, and to which an upper fastening point of said high voltage equipment-protection cover is fastened; and
a lower member extending in the vehicle width direction, and to which a lower fastening point of said high voltage equipment-protection cover is fastened, wherein
any one of said groove portion and said bent portion is positioned on the outer side in the vehicle width direction of said upper fastening point and said lower fastening point.

3. The vehicle according to claim 1, further comprising
an insulator arranged between said high voltage equipment and one of said right and left pillars, wherein
one of said extension portion covers a front of said insulator.

4. The vehicle according to claim 1, wherein the predetermined angle is measured in a horizontal plane in which the vehicle width direction extends.

5. The vehicle according to claim 1, wherein said front of the vehicle includes a seat disposed in front of said high voltage equipment-protection cover.

6. The vehicle according to claim 1, wherein a length of any one of said groove portion and said bent portion as measured in the vehicle width direction is less than a length of any one of said groove portion and said bent portion as measured in the vertical direction.

7. A vehicle comprising:
a right pillar provided at a right end part in a vehicle width direction perpendicular to a front-rear direction of the vehicle;
a left pillar provided at a left end part opposite to the right end part in the vehicle width direction;
a high voltage equipment-accommodation portion provided between the right pillar and the left pillar in the vehicle width direction;
a high voltage equipment provided in the high voltage equipment-accommodation portion and having a front face which faces toward a front direction in the front-rear direction; and a high voltage equipment-protection cover covering the high voltage equipment-accommodation portion to cover the front face of the high voltage equipment, the high voltage equipment-protection cover including a right extension portion and a left extension portion opposite to the right extension portion in the vehicle width direction, the right extension portion being provided in a vicinity of the right pillar, the left extension portion being provided in a vicinity of the left pillar, each of the right extension portion and the left extension portion having a groove portion or a bent portion, each of the right extension portion and the left extension portion being bent so as to extend from an outer side of the groove portion or the bent portion in the vehicle width direction toward the front direction at the groove portion or the bent portion, each of the right extension portion and the left extension portion being bent with respect to a central portion of the high voltage equipment-protection cover that extends from an inner side of the groove portion or the bent portion in the vehicle width direction.

8. The vehicle according to claim 7, further comprising:
an upper member extending in the vehicle width direction, and to which an upper point of the high voltage equipment-protection cover is connected; and
a lower member extending in the vehicle width direction, and to which a lower point of the high voltage equipment-protection cover is connected, wherein
the groove portion or the bent portion is positioned on an outer side in the vehicle width direction of the upper point and the lower point.

9. The vehicle according to claim 7, further comprising:
an insulator arranged between the high voltage equipment and one of the right pillar and the left pillar, wherein
the extension portion covers a front of the insulator.

10. The vehicle according to claim 7, wherein the right extension portion and the left extension portion are bent at an angle, the angle being measured in a horizontal plane in which the vehicle width direction and the front-rear direction extend.

11. The vehicle according to claim 7, wherein the vehicle includes a seat disposed in front of the high voltage equipment-protection cover in the front direction.

12. The vehicle according to claim 7, wherein a length of any one of the groove portion and the bent portion as measured in the vehicle width direction is less than a length of any one of the groove portion and the bent portion as measured in the vertical direction.

13. A vehicle comprising:
a right pillar and a left pillar disposed on opposed end parts in the vehicle width direction;
a high voltage equipment-accommodation portion partitioned between the right and left pair of pillars; and
high voltage equipment arranged in the high voltage equipment-accommodation portion, wherein:
the high voltage equipment is covered with a high voltage equipment-protection cover that covers the high voltage equipment-accommodation portion with respect to a front of the vehicle,
the high voltage equipment-protection cover has, at one of the end parts in the vehicle width direction thereof, an extension formed by an end of the high voltage equipment-protection cover that extends so as to be adjacent to one of the right and left pillars,
the extension has a groove or a bend that extends along the vertical direction so as to be orthogonal to the vehicle width direction when viewed from the front of the vehicle, and
a part of the extension on the outer side of the groove or the bend is bent so as to extend toward the front of the vehicle with respect to a central portion of the high voltage equipment-protection cover, from the groove or the bend.

* * * * *